United States Patent [19]
Muir

[11] 3,881,820
[45] May 6, 1975

[54] CONTROL SYSTEM FOR AUTOMATIC REEL-FILM ENLARGER PRINTER

[75] Inventor: Max K. Muir, Calabasas, Calif.

[73] Assignee: Information International, Inc., Los Angeles, Calif.

[22] Filed: June 17, 1974

[21] Appl. No.: 479,875

[52] U.S. Cl. .................... 355/41; 226/33; 355/50
[51] Int. Cl. .................... G03b 27/52; B65h 23/18
[58] Field of Search ............ 355/14, 40, 41, 50, 51, 355/54; 226/32, 33; 242/205, 188

[56] References Cited
UNITED STATES PATENTS

| | | | |
|---|---|---|---|
| 3,558,226 | 1/1971 | Riggs et al. | 355/54 |
| 3,600,089 | 8/1972 | Walter | 355/40 X |
| 3,634,006 | 1/1972 | Hollwedel, Jr. | 355/14 X |
| 3,672,769 | 6/1972 | Ross | 355/40 |
| 3,685,902 | 8/1972 | Blackert | 355/40 X |
| 3,768,905 | 10/1973 | Williams | 355/41 X |

*Primary Examiner*—Richard A. Wintercorn
*Attorney, Agent, or Firm*—Lindenberg, Freilich, Wasserman Rosen & Fernandez

[57] ABSTRACT

A control system for automatically printing a sequence of frames stored on a reel of film operates on marks positioned opposite the frames on the film, one mark per frame. Each mark sensed will normally stop the film drive and print the frame. Once exposure for printing has occurred, the film drive is restarted to automatically print the next frame, until the number of frame marks counted is equal to the number of frames selected. To print alternate frames of the sequence only, a gate is enabled to cause a flip-flop to alternate states with each mark sensed and thereby to inhibit every other mark sensed from stopping the film drive and printing a frame.

3 Claims, 1 Drawing Figure

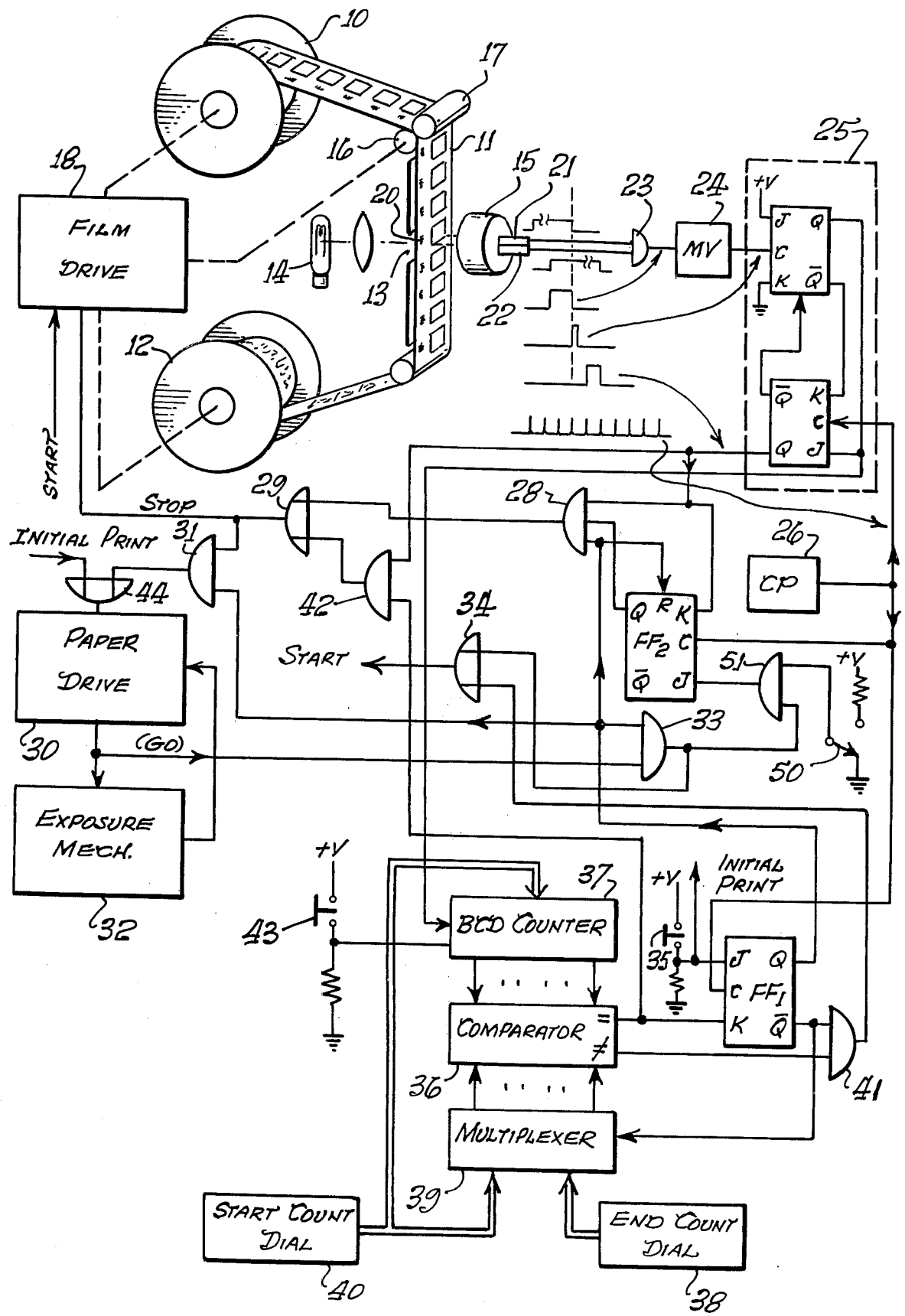

CONTROL SYSTEM FOR AUTOMATIC REEL-FILM ENLARGER PRINTER

BACKGROUND OF THE INVENTION

This invention relates to automatic film enlarger printers, and more particularly to an improvement in the automatic control system of an enlarger printer.

Film enlarger printers provide the link between all types of film and enlarged hard copy, such as xerographic copies, or offset masters to be used in printing multiple copies. A roll of film loaded into the printer on a reel is fed through enlarging optics by drive on a capstan and on a take up reel. As each frame selected to be printed reaches a window, the drive system is stopped and the frame is exposed.

Selection of frames to be copied can be made automatically by a system which detects coded marks on the film, or under control of a power driven manual search mechanism while viewing the frames on a screen. Once the first of a sequence of frames has been found, an automatic system may be used to enable a predetermined number of frames to be printed, such as while printing pages of a technical manual stored on film. Multiple copies of each frame, or a single offset master, may be printed. The printer automatically converts the offset masters so that they are ready for an offset duplicator.

When printing pages, or offset masters from which the pages are to be printed later, it is desireable to offset the film to leave a larger margin on the left of each frame. The operator can easily make the necessary adjustment while making the initial alignment of the film in front of the exposing window. If printing sucessive frames on only one side of each page, the entire sequence can be printed automatically without interruption. The extra margin for printing will always be on the same side, usually the left. A problem arises if it is desired to print on both sides of each page, because odd numbered pages require the wider margin for binding on one side, and even numbered pages require the wider margin on the other side.

SUMMARY OF THE INVENTION

In accordance with the present invention, only a single mark is used to indicate the presence of a frame on the film. The first frame to be printed may be located and stopped automatically in an exposure window by counting frame marks from the beginning or some other known reference point. But first the film is adjusted in the enlarger printer for a wider margin on one side and the automatic selection system is set for printing only every other one of the frames in a sequence, starting with the first frame. After the first printing pass, the enlarger printer is adjusted for a wider margin on the other side, and the automatic selection system is again set for printing every other frame of the same sequence starting with the second frame of the sequence. The marks on the margin of the film are counted to keep track of which frame is being printed. Each mark counted will normally stop the film drive mechanism, but for printing every other frame in sequence, means for inhibiting alternate mark pulses is enabled. Each time a mark pulse stops the film drive mechanism, with a frame centered in an exposure window, the paper drive mechanism is triggered to position a sheet on which the frame is to be printed and to emit a "go" signal once the sheet is in place. The go signal produces a "start" signal to restart the film. Before the film drive actually begins, however, the go signal triggers the exposure mechanism of the printer. To print alternate frames, the go signal that causes one frame to be exposed is transmitted through an enabled gate to set a flip-flop which in turn disables a gate to thereby inhibit the next mark pulse from stopping the film drive. That next mark pulse resets the flip-flop, however, to enable the very next mark pulse to be gated through to stop the film drive and thus cause another frame to be printed.

The novel features that are considered characteristic of this invention are set forth with particularity in the appended claims. The invention will best be understood from the following description when read in connection with the accompanying drawings.

BRIEF DESCRIPTION OF THE DRAWINGS

The sole FIGURE illustrates schematically the system of this invention.

DESCRIPTION OF PREFERRED EMBODIMENTS

Referring now to the drawing, there is illustrated schematically only so much of the mechanical features of a film enlarger printer as necessary to understand the invention. A reel 10 supplies film 11 through a film guide (not shown) to a take up reel 12 past a window 13 through which a projection lamp 14 projects a selected frame through a focusing lens 15 onto a viewing screen (not shown) and printing paper (also not shown). The viewing screen is employed during manual operation, such as to search for the first of a sequence of frames to be printed.

For controlled feed of film past the window at a fixed speed while printing, a drive capstan 16 and pinch roller 17 supply film from the supply reel 10 in a forward direction against the force of a drag brake on the supply reel. The take-up reel 12 is driven through a slip clutch to maintain desired tension on the film. Both reels are stopped by electronically actuated friction brakes included as part of the film drive represented by a functional block 18. Drive by the capstan is stopped when the reels are stopped by the capstan drag brake. That is an operation also electronically actuated in the film drive.

To stop the film with a frame to be printed in the window, a mark 20 along side the frame is first detected by a photocell 21 and then a photocell 22 as the frame moves into the window. The first photocell produces a pulse, as shown. That pulse is followed by a similar pulse produced by the second photocell 22 before the first pulse ends. The trailing edge of the first pulse occurs at the proper time for stopping the frame in the window. Allowance is made for lag in the film drive system 18.

What has been described is typical of conventional systems, except for the single mark and double photocell arrangement for detecting the presence of a frame in the window. The outputs of the photocells are applied to an AND gate 23 which transmits a pulse while the two photocells are both detecting a mark. The trailing edge of the signal from the gate 23 triggers a monostable multivibrator 24 to produce a pulse of predetermined duration. That pulse is then synchronized in a circuit 25 by clock pulses from a source 26 in order that a synchronous control system may respond to the "mark" pulse produced.

Unless the system is in a non-printing mode of operation, a gate 28 transmits the synchronized mark pulse as a "stop" pulse to the film drive 18 via an OR gate 29. That starts a paper drive 30 via an AND gate 31 enabled while the system is in the print mode. Once print paper is in position for printing the frame then before the window 13, the paper drive 30 stops and transmits a go signal, which trips an exposure mechanism 32 and restarts the film drive through an enabled AND gate 33 and an OR gate 34. The AND gate 33 is continually enabled by a J-K flip-flop $FF_1$ once set by momentary actuation of a switch 35 until the last frame is printed as determined by a comparator 36.

After exposure is complete, the exposure mechanism 32 restarts the paper drive 30 to feed out the exposed paper. The paper drive stops itself once the exposed paper has been fed out. While the exposed paper is being fed out, the film drive is turned on again to search for the next frame. This overlap in operations saves considerable time.

A counter 37 counts every mark pulse, and during a print mode the counter is continually compared with an "end count" dialed in on a dial 38 and applied through a multiplexer 39 to the comparator 36. Assuming the counter 37 is a binary coded decimal counter (BCD) as shown, the coded end number is also in the BCD form. Once the end of a sequence of frames to be printed is detected, an "end" signal resets the flip-flop $FF_1$ to disable the gate 33.

To set the system for automatic printing of a sequence of frames, a "start count" is dialed in on a dial 40 while the flip-flop $FF_1$ is reset ($\bar{Q}$ high) to enable an AND gate 41 and set the multiplexer 39 to gate the start count to the comparator. Assuming the BCD counter has been set to zero while the film is in a fully rewound state, or at any other number corresponding to the frame then positioned in the window 13, the comparator will transmit a "not equal" signal through the AND gate 41 and OR gate 34 to start the film drive. The first will run until enough marks have been sensed and counted to cause the BCD counter to equal the start count. The comparator will then transmit an "equal" signal to enable an AND gate 42 to transmit the next mark pulse and stop the film drive. The start count dialed in is equal to the number of the first frame counting from the beginning or some other reference frame. The BCD counter counts on the leading edge so that the flip-flop $FF_1$ changes states synchronously with the generation of the film mark pulse.

The BCD counter is initially set to zero or some other number by dialing in the number on the dial 40 and momentarily closing a preset switch 43. Then the start count is dialed in the dial 40. That causes the output of the comparator 36 to be not equal until the tape has been advanced to proper position.

To print the first frame of a sequence, once it has thus been properly positioned, the end count of the sequence is dialed in on the dial 38 and the print switch 35 is momentarily closed. That sets the flip-flop $FF_1$ (Q high) to enable the AND gate 33. The momentary closing of the switch 35 starts the paper drive 30 via an OR gate 44. When paper is in position, the paper drive emits a go signal through the enabled AND gate 33 and the OR gate 34 to start the film drive. The go signal also trips the exposure mechanism immediately so that by the time the film drive starts, the frame has been exposed. The exposure mechanism causes the paper drive to eject the exposed paper. The next mark pulse stops the film drive through the enabled AND gate 28. The process is repeated until the comparator transmits an equal signal to reset the flip-flop $FF_1$ and stop the film drive via the AND gate 42 for the last time. When $FF_1$ is reset, the comparator output will go to not equal since the multiplexer now selects the start count dial so the film will be driven back to the original starting point where printing began.

The system thus far described will stop the film drive at every frame, and print the frame. To print only every other frame, starting with the first, a switch 50 is "closed" to enable an AND gate 51. The go signal fed through the enabled gate 33 is then transmitted to the J input terminal of a J-K flip-flop $FF_2$. The K input is by then low (0). A clock pulse then sets that flip-flop. That disables the gate 28 so that the next synchronized mark pulse is blocked from stopping the film drive, but not from reaching the counter 37. Consequently the next frame is not printed, but the synchronized mark pulse thus blocked presents a high (+V) input signal at the K input terminal of the flip-flop $FF_2$ while the J input is by then low (0) again. Consequently the clock pulse which occurs at the end of the synchronized mark pulse resets the flip-flop $FF_2$ to enable the gate 28 for the next synchronized mark pulse. This sequence continues until the end signal resets the flip-flop $FF_1$ which in turn resets the flip-flop $FF_2$.

This system for printing every other frame can be used to print odd or even numbered frames of any sequence. For printing the odd frames, the film is positioned initially for printing the first of the odd frames. For printing the even numbered frames, the sequence is begun by initially placing the film in position for printing the first of the even frames.

Although particular embodiments of the invention have been described and illustrated herein, it is recognized that modifications and equivalents may readily occur to those skilled in the art and consequently it is intended that the claims be interpreted to cover such modifications and equivalents.

What is claimed is:

1. In a control system for automatically printing a sequence of frames stored on a reel of film in response to marks sensed on the film, said sensed marks producing mark pulses, one for each frame, said mark pulses stopping a film drive mechanism and actuating a mechanism for printing a frame, said printing mechanism emitting a go signal to automatically restart said film drive mechanism to advance film to the next frame, means for causing only alternate frames to be printed comprising a gate means for transmitting said mark pulses to said film drive mechanism and printing mechanism,
   a bistable means for enabling said gate means while in a first of two stable states,
   means for transmitting said go signal to said bistable means to set it in a second state, thereby causing said gate means to block the next mark pulse, and
   means for transmitting said mark pulses to said bistable means for resetting said bistable means to said first state.

2. Apparatus as defined by claim 1 wherein said means for transmitting said go signal to said bistable means to set it in a second state comprises a coupling means and means for selectively enabling said coupling means for printing alternate frames and disabling said coupling means for printing every frame of said sequence.

3. Apparatus as defined by claim 2 including a counter connected to receive and count every mark pulse and means for comparing the count of said counter with an end count corresponding to the last frame of said sequence, and means responsive to said comparator for inhibiting a go signal from restarting said film drive when said counter has reached a count equal to said end count.

\* \* \* \* \*